United States Patent
Suzuki

(10) Patent No.: US 6,871,581 B2
(45) Date of Patent: Mar. 29, 2005

(54) FRYER

(75) Inventor: Akira Suzuki, Nagoya (JP)

(73) Assignee: Paloma Industries, Limited, Nagoya (JP)

(*) Notice: Subject to any disclaimer, the term of this patent is extended or adjusted under 35 U.S.C. 154(b) by 0 days.

(21) Appl. No.: 10/607,742

(22) Filed: Jun. 27, 2003

(65) Prior Publication Data

US 2004/0060452 A1 Apr. 1, 2004

(30) Foreign Application Priority Data

Jul. 9, 2002 (JP) ........................................ 2002-199785

(51) Int. Cl.⁷ .............................................. A47J 37/12
(52) U.S. Cl. ............................ 99/330; 99/331; 99/332; 99/342; 99/403; 126/374.1; 126/391.1
(58) Field of Search ........................... 99/325–334, 337, 99/338, 342, 403–410; 126/391.1, 389.1, 390.1, 378.1, 374.1, 369; 210/167, DIG. 8; 219/492, 494, 497, 506, 508, 442, 486, 510, 512; 426/231–233, 438, 519, 808; 431/326.1, 170; 700/90, 99, 85, 300; 340/589

(56) References Cited

U.S. PATENT DOCUMENTS

| | | | | |
|---|---|---|---|---|
| 4,599,990 A | * | 7/1986 | Fritzsche et al. | ........ 126/374.1 |
| 4,601,004 A | | 7/1986 | Holt et al. | |
| 4,623,544 A | * | 11/1986 | Highnote | .................... 426/233 |
| 4,625,086 A | | 11/1986 | Karino | |
| 4,636,949 A | | 1/1987 | Longabaugh | |
| 4,663,710 A | | 5/1987 | Waugh et al. | |
| 4,672,540 A | | 6/1987 | Waugh et al. | |
| 4,812,625 A | | 3/1989 | Ceste, Sr. | |
| 4,858,119 A | | 8/1989 | Waugh et al. | |
| 4,913,038 A | | 4/1990 | Burkett et al. | |
| 4,928,664 A | * | 5/1990 | Nishino et al. | ........... 126/391.1 |
| 4,945,893 A | * | 8/1990 | Manchester | ............... 126/391.1 |
| 4,947,824 A | * | 8/1990 | Ejiri et al. | ................ 126/391.1 |
| 5,186,097 A | | 2/1993 | Vaseloff et al. | |
| 5,261,322 A | * | 11/1993 | Yokoyama et al. | ........... 99/330 |
| 5,297,474 A | * | 3/1994 | Tabuchi | ........................ 99/344 |
| 5,575,194 A | | 11/1996 | Maher, Jr. et al. | |
| 5,596,514 A | | 1/1997 | Maher, Jr. et al. | |
| 5,819,638 A | * | 10/1998 | Yokoyama | .................... 99/330 |
| 5,827,556 A | | 10/1998 | Maher, Jr. | |
| 6,018,150 A | | 1/2000 | Maher, Jr. | |
| 6,131,564 A | * | 10/2000 | Song | ........................ 126/391.1 |
| 6,269,808 B1 | * | 8/2001 | Murahashi | ................ 126/391.1 |
| 6,345,571 B2 | * | 2/2002 | Tateyama | ..................... 99/330 |
| 6,354,192 B2 | * | 3/2002 | Tateyama | ..................... 99/330 |
| 6,443,051 B1 | * | 9/2002 | Suzuki | ......................... 99/330 |

FOREIGN PATENT DOCUMENTS

| | | |
|---|---|---|
| EP | 1 172 058 A2 | 1/2002 |
| GB | 2 324 635 A | 10/1998 |
| WO | WO 01/13773 | 3/2001 |

* cited by examiner

*Primary Examiner*—Timothy F. Simone
(74) *Attorney, Agent, or Firm*—Burr & Brown

(57) ABSTRACT

A state of the current temperature of cooking oil in comparison with the predetermined temperature is figured out and information regarding completion of the on-going cooking and start of the next cooking is easily provided. A display portion 20 largely displays a detected oil temperature state in comparison with the predetermined temperature. As a result, a user can recognize whether the oil temperature is suitable for cooking, thereby it improves utility. Moreover, the display portion displays the oil temperature state and the difference between the predetermined temperature(340° F.) and the detected temperature at the same time. Accordingly, the remaining time to start the next cooking is easily estimated, thereby it improves utility excellently.

23 Claims, 6 Drawing Sheets

| | Temperature range (Set temperature· 340° F) | Display | |
|---|---|---|---|
| A | ~134°F | Oil Melting | blink |
| B | 135°F~314°F | LOW TEMP  −∗∗∗°F | blink |
| C | 315°F~337°F | Cooking OK  −∗∗∗°F | light |
| D | 338°F~342°F | ∎∎∎∎ Cooking OK ∎∎∎∎  Displayed interchangeably  1 : potatoes    2' 13 | light |
| E | 343°F ~ 355°F | Cooking OK  +∗∗∗°F | light |
| F | 356°F~428°F | HIGH TEMP  +∗∗∗°F | blink |
| G | 428°F~ | Overheated | blink |

Cooking can be started { C, D, E }

FIG. 1

| | Temperature range (Set temperature · 340° F) | Display | |
|---|---|---|---|
| A | ~134°F | Oil Melting | blink |
| B | 135°F~314°F | LOW TEMP -***°F | blink |
| C | 315°F~337°F | Cooking OK -***°F | light |
| D | 338°F~342°F | ■■■ Cooking OK ■■■<br>↕ Displayed interchangeably<br>1 : potatoes 2' 13 | light |
| E | 343°F ~ 355°F | Cooking OK +***°F | light |
| F | 356°F~428°F | HIGH TEMP +***°F | blink |
| G | 428°F~ | Overheated | blink |

Cooking can be started: C, D, E

FIG. 4

1 : potato    2' 13
2 : fish      1' 10

■■■ Cooking OK ■■■

× No display
○ Display

FIG. 6

| Cooking with time correction | | Cooking without time correction | |
|---|---|---|---|
| 2 : fish | 2' 13 | 1 : potato | 2' 14 |
| 2 : fish | 2' 12 | 1 : potato | 2' 13 |
| 2 : fish | 2' 12 | 1 : potato | 2' 12 |
| 2 : fish | 2' 11 | 1 : potato | 2' 11 |
| 2 : fish | 2' 11 | 1 : potato | 2' 10 |
| 2 : fish | 2' 10 | 1 : potato | 2' 09 |
| ... | | ... | |

A display portion displays these shaded messages

A display portion displays these shaded messages

FRYER

BACKGROUND OF THE INVENTION

This application claims the benefit of Japanese Application Number 2002-199785 filed Jul. 9, 2002, the entirety of which is incorporated by reference.

1. Field of the Invention

The present invention relates to a fryer in which a display portion of an operating panel displays various information such as a temperature of cooking oil and the remaining time of a cooking timer.

2. Description of Related Art

Conventionally, cooking utensils such as fryers used for frying foods in fast food restaurants etc., have a controller stored with various controlling programs for cooking and an operating panel for instructing an operation of the controlling programs for cooking. This operating panel includes a displaying portion for displaying a cooking menu, a temperature of cooking oil, and the remaining time of a cooking timer for example, and various switches such as an operation switch and a menu switch for starting a cooking timer set for each cooking menu.

However, the display portion merely displays the current temperature of the cooking oil, so that it is hard to know whether the current temperature reaches a predetermined temperature, and to know the difference between the current temperature and the predetermined temperature.

Further, even during a cooking timer's operation, the remaining time of the cooking timer is not displayed unless a changeover is performed from a temperature display to a remaining time display. As a result, from a place having a short distance where the changeover is impossible, it is hard to see when cooking will be finished.

In another type of fryer, only the remaining time of a cooking timer is displayed during cooking, but a temperature of cooking oil is not displayed. Accordingly, when a plurality of cooking is on-going, it is necessary to perform a changeover to a temperature display by pressing a switch, which lowers an efficiency of work. Displaying a temperature of the cooking oil is necessary since a user is instructed to start cooking by putting foods into the cooking oil only when the oil temperature is within a predetermined temperature range, and it is difficult to know when to provide foods without a temperature display.

The present invention solves the aforementioned problems, and an object of the present invention is to provide a fryer which facilitates to figure out a state of the current temperature of cooking oil in comparison with the predetermined temperature and to obtain information regarding completion of the on-going cooking and start of the next cooking easily.

SUMMARY OF THE INVENTION

To achieve the above-mentioned object, in accordance with a first aspect of the present invention, a fryer includes an oil vessel for containing cooking oil, a heating means for heating the cooking oil in the oil vessel, a heat controlling means for setting the cooking oil at the predetermined temperature by controlling the heating means, a temperature sensor for detecting a temperature of the cooking oil, and a display portion for displaying the temperature of the cooking oil and the like, wherein based on the predetermined temperature the oil temperature is classified into three ranges: the most desirable temperature range for cooking, temperature ranges capable of cooking excluding the above range, temperature ranges in which a start of cooking is prohibited. Here, the display portion displays the temperature range into which the oil temperature detected by the temperature sensor is classified.

A fryer in accordance with a second aspect of the present invention, there is provided a fryer according to the first aspect, wherein the display portion also displays the difference between the predetermined temperature and the oil temperature detected by the temperature sensor.

A fryer in accordance with a third aspect of the present invention, there is provided a fryer according to the first or second aspect, wherein a display form of temperature ranges in which a start of cooking is prohibited is different from that of the other ranges.

A fryer in accordance with a fourth aspect of the present invention, there is provided a fryer according to any of the first, second and third aspects, further comprising a plurality of cooking timers for counting the predetermined time set in accordance with each menu, and a plurality of menu switches for starting the cooking timers, wherein the display portion alternately displays a temperature range to which the oil temperature detected by the temperature sensor belongs and the remaining time of the cooking timers while the cooking timers are counting.

A fryer in accordance with a fifth aspect of the present invention, there is provided a fryer according to the fourth aspect, wherein the display portion is commonly used for displaying the remaining time of the cooking timers and wherein, the display portion gives priority to display the remaining time of the timer which shows the shortest time remained while two or more cooking timers are counting.

A fryer in accordance with a sixth aspect of the present invention, there is provided a fryer according to the fifth aspect, further comprising a correction means for correcting the remaining time of the cooking timers based on the oil temperature, wherein when a timer which originally showed the shortest time remained is replaced with another cooking timer which comes to an end first, the display portion displays the remaining time of the replaced cooking timer while cooking is on-going.

A fryer in accordance with a seventh aspect of the present invention, there is provided a fryer according to the fifth or sixth aspect, wherein the display portion displays only the remaining time of a cooking timer corresponding to the menu switch while a user is operating the same.

In a fryer according to a first aspect of the present invention with the above configuration, the display portion displays the range into which the oil temperature detected by the temperature sensor is classified: the most desirable temperature range for cooking, temperature ranges capable of cooking but excluding the above range, temperature ranges in which a start of cooking is prohibited. Thus, it is possible to find whether the current oil temperature is suitable for cooking at a glance. Further, since the temperature range capable of cooking is subdivided Into the most desirable for cooking and the other, when the most tasteful foods should be obtained, it is desirable to wait for oil temperature to be reached to the most suitable temperature range for cooking before putting foods into the oil and starting cooking. On the other hand, when it is necessary to cook foods quickly due to a shortage of time, it is desirable to start cooking while oil temperature is within temperature ranges capable of cooking even though the oil temperature is out of-the most desirable range. According to the above, a flexible utilization is realized.

In a fryer according to a second aspect of the present invention, the display portion also displays the difference between the predetermined temperature and the detected temperature. Accordingly, it is easy to estimate waiting time for a start of the next cooking. That is, waiting time for oil temperature to be recovered until an appropriate temperature for cooking when, for example, oil temperature is lowered due to an early stage of heating or providing additional foods is easily estimated.

In a fryer according to a third aspect of the present invention, the display form of temperature ranges in which a start of cooking is prohibited is different from that of temperature ranges capable of cooking, whereby it is possible to confirm whether or not cooking can be started at a glance from a place having a distance.

In a fryer according to a fourth aspect of the present invention, during an operation of the cooking timers the display portion alternately displays the temperature range to which oil temperature belongs and the remaining time of the cooking timers, which allows a user to know when the current cooking will be finished without operating a switch.

In a fryer according to a fifth aspect of the present invention, the display portion alternately displays the temperature range to which oil temperature belongs and the remaining time of a cooking timer which comes to an end first among a plurality of cooking timers. That is, it is possible to figure out when the menu having the shortest remaining time will be finished. Accordingly, the user can surely know how long the waiting time is and utilize the waiting time for other jobs in relief until taking out of cooked foods when cooking is finished. Further, the remaining time of a plural cooking timer can be displayed in one display portion, which gives advantage of display space or manufacturing cost thereby.

In a fryer according to a sixth aspect of the present invention, the correction means corrects the remaining time of the cooking timers, and when a timer which originally showed the shortest time remained is replaced with another cooking timer which comes to an end first, the display portion displays the remaining time of the replaced timer. Therefore, it is always possible to figure out when the proximate cooking will be finished.

In a fryer according to a seventh aspect of the present invention, the display portion displays only the remaining time of the cooking timer corresponding to the menu switch while a user is operating the same. Owing to this, during an operation of a plurality of cooking timers a user can confirm the remaining time of a specific cooking timer which he would like to know, hence it improves the utility of the fryer.

BRIEF DESCRIPTION OF THE .DRAWINGS

FIG. 1 is an explanatory view explaining for a display state of a display portion for an embodiment of the present invention.

FIG. 4 is an explanatory view explaining for a display state of a display portion when a plurality of cooking is on-going.

FIG. 6 is an explanatory view explaining for a change of the remaining time of cooking timers when correction of the remaining time is performed.

DESCRIPTION OF THE PREFERRED EMBODIMENTS

The configuration and operation of the present invention as described above will become clearer through the following description of a preferred embodiment of the present invention with reference to FIGS. 1–6.

Figure 2:
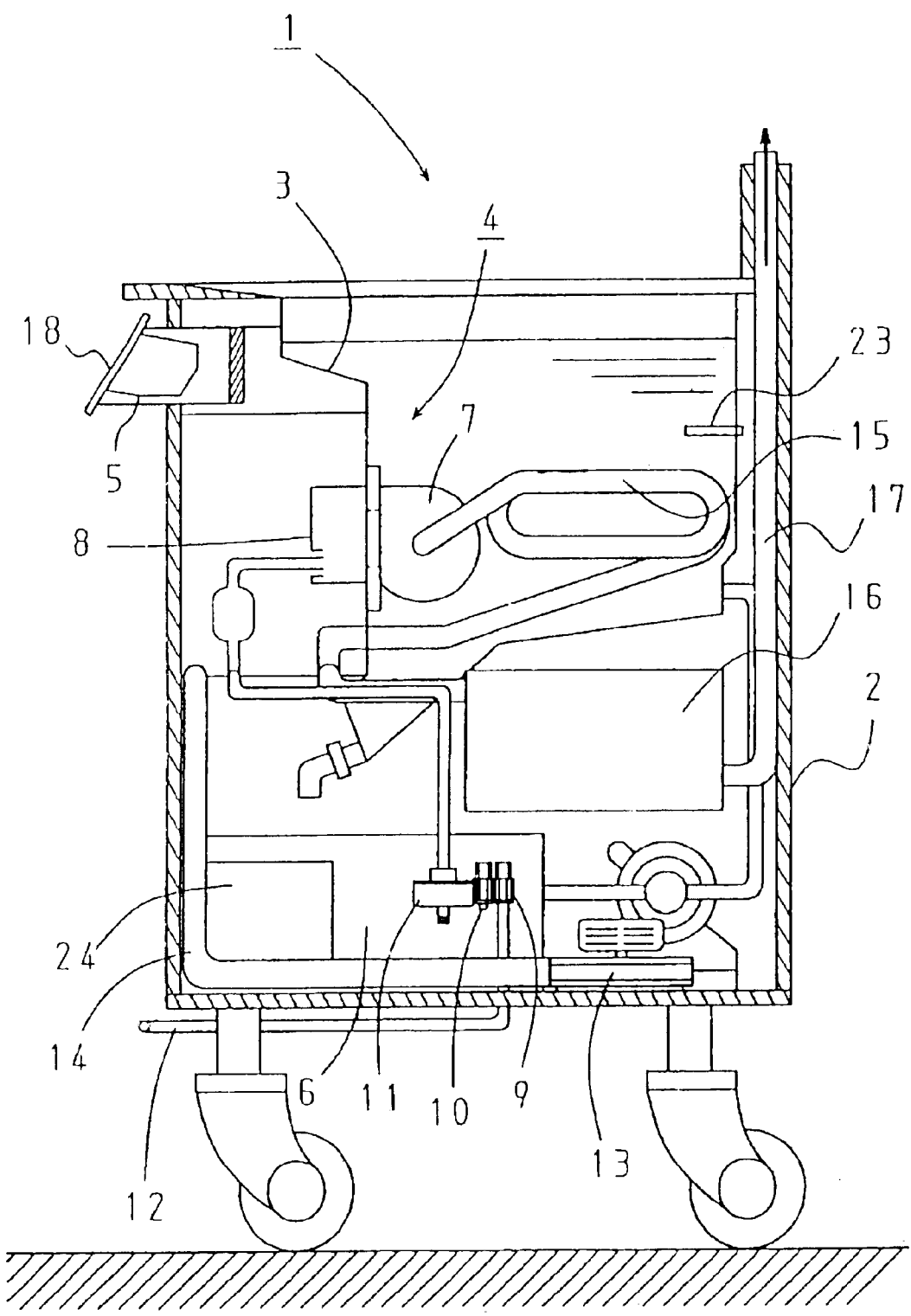
FIG. 2 is a schematic view of a fryer for the present embodiment.

FIG. 2 is a schematic view of an industrial fryer (hereinafter, simply referred to as a fryer) according to an embodiment of the present invention.

As shown in FIG. 2, a fryer 1 has a casing 2, which includes an oil vessel 3 filled with cooking oil for frying foods (hereinafter, simply referred to as oil), a pulse burner 4 provided within the oil vessel 3 for heating the oil, a temperature sensor 23 for detecting a temperature of the oil, a heating controller 24 for controlling the operation of the pulse burner 4 so that the temperature of the oil is maintained at the predetermined temperature, a cooking controller 5 for alarming an end of cooking timers installed therein according to each cooking menu, and an oil reservoir 6 for temporarily holding the oil to be filtered in the oil vessel 3.

The pulse burner 4 has a combustion chamber 7 located in the oil vessel 3 and a mixing chamber 8 located at the outside of the oil vessel 3 and communicated with the combustion chamber 7. The mixing chamber 8 is connected to a gas conduit 12 for feeding a flow of fuel gas. The gas conduit 12 is provided with, from the upstream side, an intake electromagnetic valve 9, a main electromagnetic valve 10, and a gas governor 11. The mixing chamber 8 is also connected to an air supply conduit 14 with which a blower 13 is provided for supply of fresh combustion air.

The combustion chamber 7 is connected with a tail pipe 15 extending through the oil vessel 3. The tail pipe 15 is connected via a decoupler 16 at the outside of the oil vessel 3 to an exhaust pipe 17 which has an outward opening. It should be noted that a solid oil at a room temperature such as shortening is employed as cooking oil.

Figure 3:
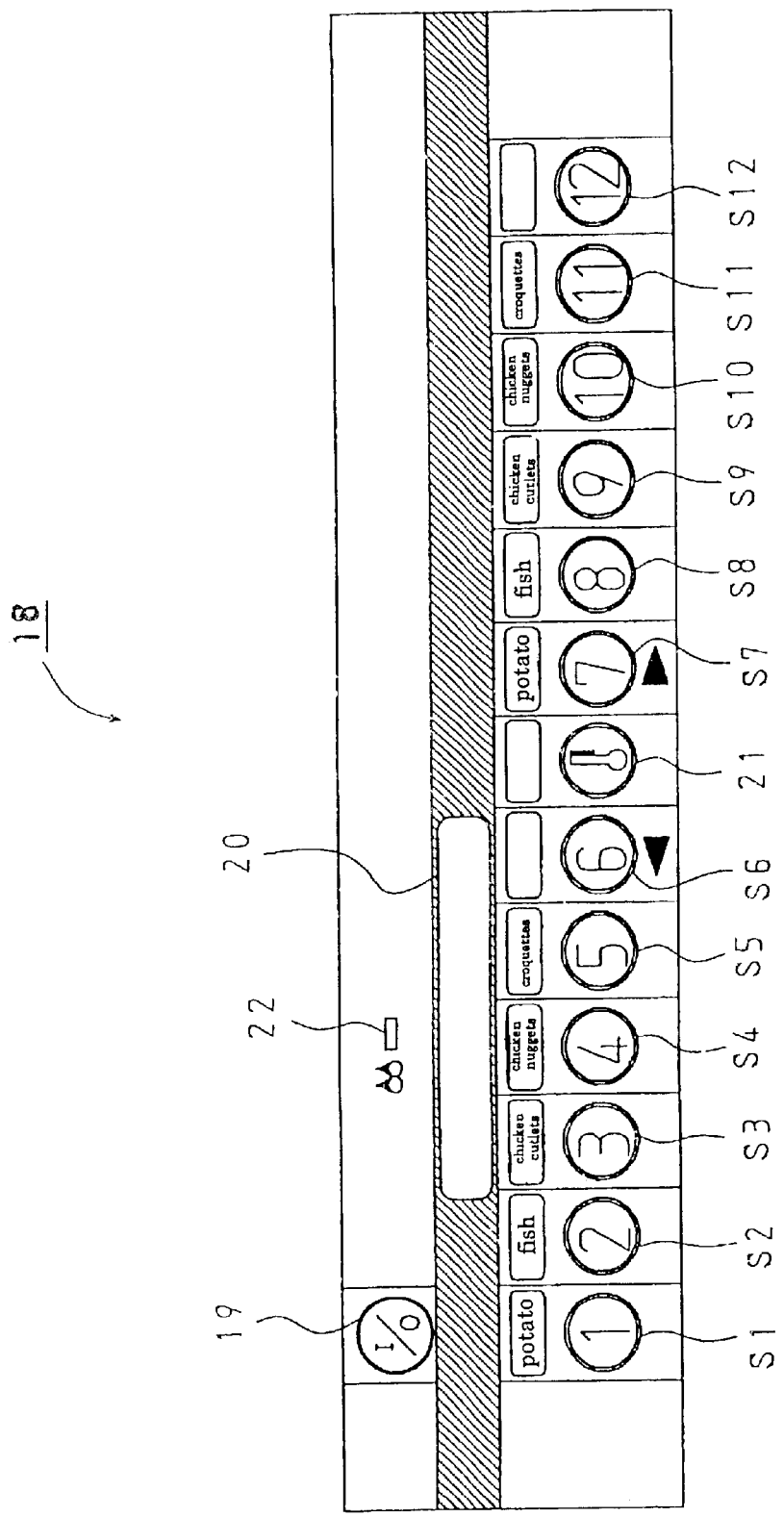
FIG. 3 is a front view of a display panel for the present embodiment.

The primary part of the cooking controller 5 is configured by a microcomputer, and an operating panel 18 is provided at the front of the casing 2. FIG. 3 shows a front view of the operating panel 18, which includes an operation switch 19 for performing ON/OFF operation of the fryer 1, a display portion 20 for displaying cooking menus, the oil temperature and the remaining time of the cooking timers, a changeover switch 21 for alternating displays of the display portion 20, a lamp 22 for emitting a light during an operation of the pulse burner 4, menu switches S1–S12 for setting the cooking timers for the predetermined time according to each cooking menu.

Each of the switches S1–S12 has a cooking menu at the upper portion thereof and has a menu number at the center thereof respectively. In addition, an LED is installed at the backside of the operation switch 19 and each of the switches S1–S12 respectively, and when each of the above switches is pressed the LED is lighted.

The heating controller 24 has the primary part configured by a microcomputer. It is connected on its input side to the temperature sensor 23 provided in the oil vessel 3 and is connected on its output side to the electromagnetic valves, a fan motor, lamps and buzzers, etc. Further, the heating controller 24 is connected to the cooking controller 5 which includes the operation switch 19. In response to ON control of the operation switch 19, the heating controller 24 performs ON/OFF control of the pulse burner 4 so as to maintain the oil temperature at a setting level (340° F.=approximately 171.1° C.).

Now the operation of the above-described fryer will be described below.

With the above-described fryer, oil is filled into the oil vessel 3, and once the operation switch 19 is turned on, the pulse burner starts to heat the oil and maintains a temperature of the oil at a setting level (340° F.). Then when each menu switch corresponding to the cooking menu respectively is turned on, each cooking timer starts to count the set time differently determined by each cooking menu, and the cooking is started by putting foods into the oil vessel 3. In other words, the set temperature is fixed, while the cooking time varies in accordance with each cooking menu. Further, an LED is lighted when the corresponding menu switch is pressed. When the time of the cooking timer terminates, an alarm goes off to notify completion of cooking and then cooked foods are taken out of the oil vessel 3.

In this fryer, as plural menu switches are provided, several kinds of cooking can be done at the same time by putting several kinds of foods into the oil vessel 3. That is, even while one cooking is on-going, a user can carry out another kind of cooking at the same time by putting foods into the oil for another cooking. In this case, a menu switch is pressed every time when foods for another cooking are put into the oil vessel, whereby completion of each cooking can be checked by a termination of each cooking timer.

Menu switches S1–S12 are used for various kinds of cooking: S1 and S7 for fried potatoes, S2 and S8 for fried fish, S3 and S9 for chicken cutlets, S4 and S10 for chicken nuggets, and S5 and S11 for croquettes. Each of the above pair of menu switches, for example, S1 and S7, has a cooking timer counting the same set time. Moreover, since there are two menu switches for one cooking menu, for example, fried potatoes, two cooking for fried potatoes can be carried out at the same time. Lastly, menu switches S6 and S12 are spare switches.

Next, a display state of the display portion 20 will be described below.

With reference to FIG. 1, a display of the display portion 20 is changed over according to the temperature detected by the temperature sensor 23.

When the detected temperature is below 134° F. (a temperature range A), that is, the oil is melting from a solid state, a display "oil melting" blinks.

When the detected temperature is within 135–314° F. (a temperature range B), that is, the oil temperature is lower than temperature ranges capable of cooking, a display "LOW TEMP –*° F." blinks. "LOW TEMP," the left side of the display, means that the oil temperature is much lower than temperature ranges capable of cooking. "–*° F.," the right side of the display, indicates the degree of the difference between the predetermined temperature (340° F.) and the actual oil temperature. Note that "***" is replaced with numbers.

When the detected oil temperature is within 315–337° F. (a temperature range C), that is, the oil temperature is within the temperature ranges capable of cooking but slightly lower than the most desirable range, "Cooking OK –***° F." is displayed with light When the detected temperature is within 338–342° F. (a temperature range D), that is, the most desirable temperature range for cooking, "□□□□cooking OK□□□□" is displayed with light. Thus □ is displayed at the both lateral side of the message in order to effectively indicate that this is the most desirable temperature range.

Further, in the temperature range D, during an operation of a cooking timer, both "Cooking OK" and the remaining time of the cooking timer are displayed alternately at one second intervals. For example, in the event that the oil temperature is within the temperature range D and a cooking timer of cooking menu 1 for frying potatoes is counting, "□□□□Cooking OK□□□□" and "1: potato 2'13" are displayed by turns at one second intervals. Note that "2'13" means that the remaining time of the cooking timer is 2 minutes and 13 seconds.

On the other hand, when a plurality of cooking is on-going at the same time, that is, two or more cooking timers are counting, a timer showing the shortest time remained is employed to display the remaining time as well as a message indicating that the oil temperature is within the most desirable temperature range for cooking. For example, referring to FIG. 4, if a cooking menu 1 for potatoes and a cooking menu 2 for fish are carried out at the same time and the remaining time of the cooking for fish is shorter than that of the cooking for potatoes, only the remaining time of cooking for fish is displayed.

When the detected temperature is within 343–355° F. (a temperature range E), that is, the oil temperature is within the temperature ranges capable of cooking but slightly higher than the most desirable range for cooking, "Cooking OK +***° F." is displayed with light.

When the detected temperature is within 356–428° F. (a temperature range F), that is, the oil temperature is much higher than temperature ranges capable of cooking, a display "HIGH TEMP +*° F." blinks. "HIGH TEMP," the left side of the display, means that the oil temperature is much higher than temperature ranges capable of cooking. "+*° F.," the right side of the display, indicates the degree of the difference between the predetermined temperature (340° F.) and the actual oil temperature.

When the detected temperature is higher than 428° F. (a temperature range G), that is, the oil is extremely heated, a display "overheated" blinks.

As mentioned above, the cooking controller 5 detects the state of the menu switches. That is, when the cooking controller 5 is input that a menu switch is pressed, the corresponding cooking timer begins to count and the display portion 20 displays an oil temperature state in a form corresponding to the oil temperature. Moreover, when the detected temperature is within the temperature range D, not only the oil temperature state but the remaining time of the cooking timer is displayed alternately. When the cooking timer terminates, an alarm goes off to notify completion of the cooking.

On the other hand, when the cooking controller 5 is input that another menu switch is pressed during an operation of a cooking timer, a cooking timer corresponding to the menu switch begins to count at the same time. In this case, the remaining time of the timer which shows the shortest time remained as well as an oil temperature state is displayed.

As described above, a display appears with light when a temperature is in the range capable of cooking (temperature ranges C–E), while a display blinks when a temperature is in the range in which a start of cooking is impossible (temperature ranges A, B, F, G). Therefore, a user can recognize at a glance whether starting of cooking is possible without reading a message of the display portion 20.

Further, when a plurality of cooking is on-going at the same time, particularly in the temperature range D, two displays appear alternately, that is, the remaining time of the timer which shows the shortest time remained, and a message indicating that an oil temperature is within a most desirable temperature range for cooking. When the remaining time and the message are displayed as mentioned above, utility is improved, however, it often happens that a user would like to know the remaining time of another cooking timer. In this case, the remaining time is displayed by being kept on pressing a menu switch in which the corresponding cooking timer is counting. At that time, the counting cooking timer can be seen because an LED installed in the switch is lighted.

In other words, when the cooking controller 5 is input that a menu switch is being pressed, the display portion 20 displays only the remaining time of a corresponding cooking timer.

Figure 5:
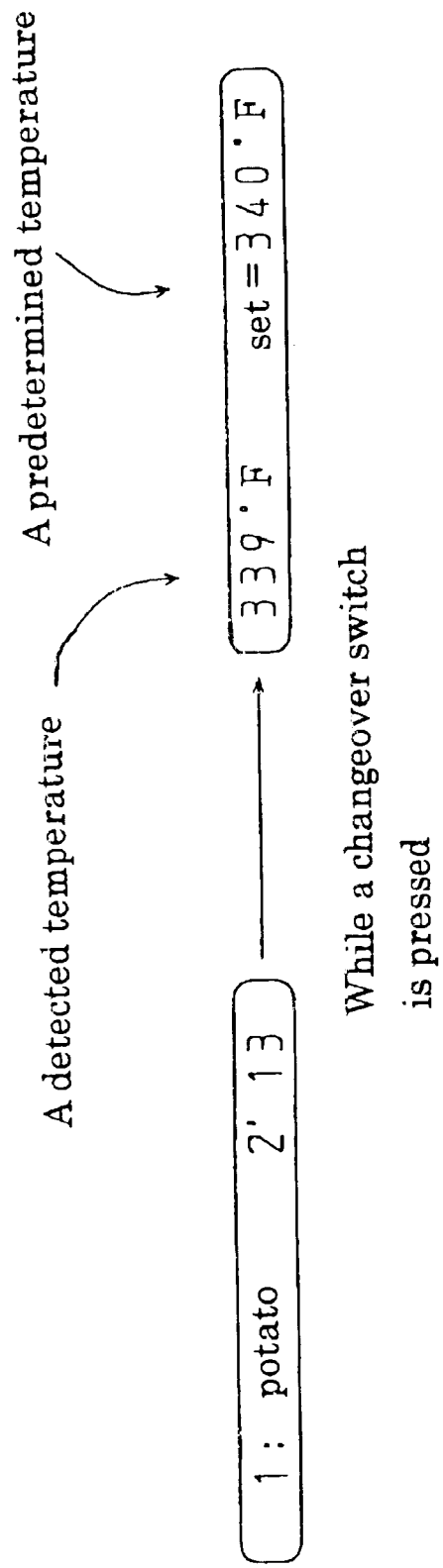
FIG. 5 is an explanatory view explaining for a display state of a display portion when a changeover switch is depressed.

While the changeover switch 21 is being pressed, the display portion 20 is changed over to display the detected oil temperature and the predetermined temperature as shown in FIG. 5.

As described above, the fryer 1 according to the present invention, the display panel 20 largely displays a detected oil temperature state in comparison with the predetermined temperature. As a result, a user can recognize whether the oil temperature is suitable for cooking at a glance, thereby it increases utility.

In addition to that, the display of the oil temperature state in comparison with the predetermined temperature shows a user whether or not the oil temperature is capable for cooking, and the display subdividedly shows the user whether the oil temperature is the most desirable for cooking. Thus, when the most tasteful foods are needed, the foods could be cooked in a temperature range A, which is the most desirable for cooking. On the other hand, when the foods need to be quickly cooked due to a shortage of time, the foods could be cooked in temperature ranges C, E which are capable of cooking but not the most desirable range. Therefore, a flexible utilization is realized.

Also, the display portion displays the oil temperature state and the difference between a predetermined temperature (340° F.) and the detected temperature simultaneously. Accordingly, waiting time for a start of the next cooking is easily estimated. Thus, a user can appropriately utilize the waiting time for other jobs, preparations and the like, thereby it improves utility excellently.

In the temperature range D in which cooking is actually on-going, while the cooking timer is counting, each of two displays alternately appears automatically. One of the two displays is a display indicating that the detected oil temperature is within the most desirable temperature range for cooking, and the other is a display indicating that the remaining time of a cooking timer. Accordingly, in case of finding the remaining time, there is no need to operate switches for changing the display during cooking, and thus it improves utility.

Moreover, in the event that a plurality of cooking is on-going and a plurality of cooking timers are counting, the remaining time of the timer which shows the shortest time remained is displayed. Thus, it is possible to figure out when the proximate cooking will be finished. Owing to this, a user can be easily aware of timing to take out cooked foods, which prevents from losing the timing. Therefore, the user can figure out a precise spare time and utilize it for other jobs in relief.

Moreover, while a menu switch is being pressed, the remaining time of a cooking timer corresponding to the menu switch is displayed. Therefore, when a plurality of cooking is on-going at the same time, the user can recognize the completion time of cooking that he wants to know, which improves utility.

Further, as the remaining time of a plurality of cooking timers are displayed on a single display portion 20, there needs no extra space to display and it is advantageous to reduce manufacturing costs.

The above description of embodiment of the present invention has in no way been provided for the purpose of limiting the present invention, and it is of course possible to diversely embody the present invention within the scope not departing from the essential points of the present invention.

As an example of an altered embodiment, completion time of a specific cooking timer may be corrected according to oil temperature. This means that a timer does not uniformly notify completion of cooking when cooking time elapsed, but the cooking time may be corrected to be either longer or shorter in accordance with oil temperature instead. This is because foods are cooked differently by being heated from higher or lower temperature than the predetermined temperature.

Specifically, when fish is cooked, it is necessary to be thoroughly heated to prevent food poisoning. Thus, cooking time is corrected to be longer if oil temperature is low. More specifically, when the difference between a predetermined temperature and a detected temperature is represented as delta T (which equals, the predetermined temperature minus the detected temperature), then delta T is multiplied by a predetermined coefficient to be cumulated by each second. Subsequently, the remaining time of a cooking timer is added by one second every time when a cumulative value exceeds one second. It should be noted that when the cumulative value is negative, which means the detected temperature is higher than the predetermined temperature, correction is not made.

With reference to FIG. 6, in the event that the above correction is made, the order of the remaining time length may be reversed, specifically, cooking without time correction (that is, potato cooking) is finished earlier than cooking with time correction. In this case, a changeover is performed to display the remaining time of the timer which shows the shortest time remained in the temperature range D. Therefore, it is always possible to figure out when the proximate cooking will be finished and prepare for completion of the cooking without missing the timing in relief.

As described above, in a fryer according to a first aspect of the present invention, a user can recognize at a glance whether the current oil temperature is suitable for cooking, thereby it improves utility. Further, a flexible utilization which complies with the user's needs is realized.

In a fryer according to a second aspect of the present invention, the difference between the predetermined temperature and the detected temperature is displayed. Accordingly, the remaining time for start of the next cooking is easily estimated and it is possible to carry out other cooking or prepare for the next cooking appropriately, which improves utility.

In a fryer according to a third aspect of the present invention, it is possible to confirm at a glance from a place having a distance whether or not cooking can be started.

In a fryer according to a fourth aspect of the present invention, a user can see without operating a switch when the on-going cooking will be finished, thereby it improves utility.

In a fryer according to a fifth aspect of the present invention, it is possible to figure out when the proximate cooking will be finished even when a plurality of cooking is carried out. Accordingly, the user can take out cooked foods with the best timing and perform other jobs which take approximate remaining time till completion of the cooking.

In a fryer according to a sixth aspect of the present invention, when plurality of cooking is carried out, it is always possible to figure out when the proximate cooking will be finished, even when a correction is made and the display portion displays the remaining time of the proximate cooking timer which is replaced.

In a fryer according to a seventh aspect of the present invention, a user can see the completion time of cooking which he would like to now, hence it improves the utility.

What is claimed is:

1. A fryer comprising:

an oil vessel containing cooking oil:

heating means that heats the cooking oil in said oil vessel;

heat controlling means that sets the cooking oil at a predetermined temperature by controlling said heating means;

a temperature sensor that detects the temperature of the cooking oil; and a display portion that displays at least the temperature of the cooking oil;

wherein, based on the predetermined temperature, the detected oil temperature is classified into one of three ranges including (1) the most desirable temperature range for cooking, (2) temperature ranges capable of cooking excluding the above range(1), and (3) temperature ranges in which the start of cooking is prohibited; and wherein said display portion displays the temperature range into which the detected oil temperature is classified and also displays the difference between the predetermined temperature and the detected oil temperature.

2. The fryer as claimed in claim 1, wherein said temperature range (3), in which the start of cooking is prohibited, is displayed in a form that is different from that of the others of said three ranges.

3. The fryer as claimed in claim 2, further comprising a plurality of menu switches for starting a plurality of cooking timers, each said menu switch being set with a predetermined time; and a plurality of cooking timers associated with a respective one of said menu switches that count the predetermined time set in accordance with each said menu switch when said menu switches are operated to start said cooking timers;

wherein said display portion alternately displays the temperature range in which the detected oil temperature is classified and the remaining time of said cooking timers while said cooking timers are counting.

4. The fryer as claimed in claim 3, wherein said display portion commonly displays the remaining time of said cooking timers, giving priority to displaying the remaining time of one of said cooking timers having the shortest time remaining while two or more of said cooking timers are counting.

5. The fryer as claimed in claim 4, wherein said display portion displays only the remaining time of a cooking timer corresponding to one of said menu switches while a user is operating that one of said menu switches.

6. The fryer as claimed in claim 4, further comprising correction means for correcting the remaining time of said cooking timers based on the oil temperature by replacing said one of said cooking timers originally having the shortest time remaining with another cooking timer which comes to an end first;

wherein said display portion displays the remaining time of the replaced cooking timer while cooking is on-going.

7. The fryer as claimed in claim 6, wherein said display portion displays only the remaining time of a cooking timer corresponding to one of said menu switches while a user is operating that one of said menu switches.

8. The fryer as claimed in claim 1, further comprising a plurality of menu switches for starting a plurality of cooking timers, each said menu switch being set in accordance with a predetermined time; and a plurality of cooking timers associated with a respective one of said menu switches that count the predetermined time set in accordance with each said menu switch when said menu switches are operated to start said cooking timers;

wherein said display portion alternately displays the temperature range in which the detected oil temperature is classified and the remaining time of said cooking timers while said cooking timers are counting.

9. The fryer as claimed in claim 8, wherein said display portion commonly displays the remaining time of said cooking timers giving priority to displaying the remaining time of one of said cooking timers having the shortest time remaining while two or more of said cooking timers are counting.

10. The fryer as claimed in claim 9, wherein said display portion displays only the remaining time of a cooking timer corresponding to one of said menu switches while a user is operating that one of said menu switches.

11. The fryer as claimed in claim 9, further comprising correction means for correcting the remaining time of said cooking timers based on the detected oil temperature by replacing said one of said cooking timers originally having the shortest time remaining with another cooking timer which comes to an end first;

wherein said display portion displays the remaining time of the replaced timer while cooking is on-going.

12. The fryer as claimed in claim 11, wherein said display portion displays only the remaining time of a cooking timer corresponding to one of said menu switches while a user is operating that one of said menu switches.

13. A fryer comprising:

an oil vessel containing cooking oil:

heating means that heats the cooking oil in said oil vessel;

heat controlling means that sets the cooking oil at a predetermined temperature by controlling said heating means;

a temperature sensor that detects the temperature of the cooking oil; and a display portion that displays at least the temperature of the cooking oil;

wherein, based on the predetermined temperature, the detected oil temperature is classified into one of three ranges including (1) the most desirable temperature range for cooking, (2) temperature ranges capable of cooking excluding the above range(1), and (3) temperature ranges in which the start of cooking is prohibited;

wherein said display portion displays the temperature range into which the detected oil temperature is classified; and wherein said temperature range (3), in which the start of cooking is prohibitied, is displayed in a form that is different from that of the others of said three ranges.

14. The fryer as claimed in claim 13, further comprising a plurality of menu switches for starting a plurality of cooking timers, each said menu switch being set in accordance with a predetermined time; and a plurality of cooking timers associated with a respective one of said menu switches that count the predetermined time set in accordance with each said menu switch when said menu switches are operated to start said cooking timers;

wherein said display portion alternately displays the temperature range in which the detected oil temperature is classified and the remaining time of said cooking timers while said cooking timers are counting.

15. The fryer as claimed in claim 14, wherein said display portion commonly displays the remaining time of said cooking timers giving priority to displaying the remaining time of one of said cooking timers having the shortest time remaining while two or more of said cooking timers are counting.

16. The fryer as claimed in claim 15, wherein said display portion displays only the remaining time of a cooking timer corresponding to one of said menu switches while a user is operating that one of said menu switches.

17. The fryer as claimed in claim 15, further comprising correction means for correcting the remaining time of said cooking timers based on the oil temperature, by replacing said one of said cooking timers originally having the shortest time remaining with another cooking timer which comes to an end first;

wherein said display portion displays the remaining time of the replaced cooking timer while cooking is on-going.

18. The fryer as claimed in claim 17, wherein said display portion displays only the remaining time of a cooking timer corresponding to one of said menu switches while a user is operating that one of said menu switches.

19. A fryer comprising:

an oil vessel containing cooking oil:

heating means that heats the cooking oil in said oil vessel;

heat controlling means that sets the cooking oil at a predetermined temperature by controlling said heating means;

a temperature sensor that detects the temperature of the cooking oil a display portion that displays at least the temperature of the cooking oil;

a plurality of menu switches for starting a plurality of cooking timers, each said menu switch being set in accordance with a predetermined time; and a plurality of cooking timers associated with a respective one of said menu switches that count the predetermined time set in accordnce with each said menu switch when said menu switches are operated to start said cooking timers;

wherein, based on the predetermined temperature, the detected oil temperature is classified into one of three ranges including (1) the most desirable temperature range for cooking, (2) temperature ranges capable of cooking excluding the above range (1), and (3) temperature ranges in which the start of cooking is prohibited; and wherein said display portion alternately displays the temperature range in which the detected oil temperature is classified and the remaining time of said cooking timers while said cooking timers are counting.

20. The fryer as claimed in claim 19, wherein said display portion commonly displays the remaining time of said cooking timers giving priority to displaying the remaining time of one of said cooking timers having the shortest time remaining while two or more of said cooking timers are counting.

21. The fryer as claimed in claim 20, wherein said display portion displays only the remaining time of a cooking timer corresponding to one of said menu switches while a user is operating that one of said menu switches.

22. The fryer as claimed in claim 20, further comprising correction means for correcting the remaining time of said cooking timers based on the detected oil temperature by replacing said one od said cooking timers originally having the shortest time remaining with another cooking timer which comes to an end first;

wherein said display portion displays the remaining time of the replaced timer while cooking is on-going.

23. The fryer as claimed in claim 22, wherein said display portion displays only the remaining time of a cooking timer corresponding to one of said menu switches while a user is operating that one of said menu switches.

* * * * *

UNITED STATES PATENT AND TRADEMARK OFFICE
CERTIFICATE OF CORRECTION

PATENT NO. : 6,871,581 B2
DATED : March 29, 2005
INVENTOR(S) : Akira Suzuki

It is certified that error appears in the above-identified patent and that said Letters Patent is hereby corrected as shown below:

Title page,
Item [57] ABSTRACT, please replace the ABSTRACT in its entirety with the following rewritten ABSTRACT, -- A fryer includes an oil vessel for containing cooking oil, heating means for heating the cooking oil in the oil vessel, heat controlling means for setting the cooking oil at a predetermined temperature by controlling the heating means, temperature sensor for detecting the temperature of the cooking oil and a display portion for displaying the temperature of the cooking oil and the like. Based on the predetermined temperature, the detected oil temperature is classified into three ranges: (1) the most desirable temperature range for cooking, (2) temperature ranges capable of cooking excluding the above range (1), and (3) temperature ranges in which the start of cooking is prohibited. The display portion displays the temperature range in which the detected oil temperature is classified, and also displays the difference between the predetermined temperature and the detected oil temperature. --

Column 1,
Line 1, please delete "BACKGROUND OF THE INVENTION"
Line 8, please add -- BACKGROUND OF THE INVENTION -- before the line that includes "1. Field of the Invention"
Line 67, please add -- (1) -- before "the"; please add -- (2) -- before the second occurrence of "temperature"

Column 2,
Line 2, please add -- and (3) -- before "temperature"
Lines 6, 11, 16, 26, 33 and 42, please delete "A fryer"
Lines 13 and 44, please change "aspect" to -- aspects --
Line 47, please change the first and second occurrences of "a" to -- the --
Line 50, please add -- (1) -- before the second occurrence of "the"
Line 51, please add -- (2) -- before the second occurrence of "temperature"
Line 52, please add -- and (3) -- before "temperature"

Column 3,
Lines 1, 10, 15, 21, 34 and 42, please change the first and second occurrences of "a" to -- the --
Line 16, please delete "an" please add -- , -- after "timers"

Column 4,
Line 1, please change "DESCRIPTION OF THE PREFERRED EMBODIMENTS" to -- DETAILED DESCRIPTION OF THE INVENTION --

UNITED STATES PATENT AND TRADEMARK OFFICE
CERTIFICATE OF CORRECTION

PATENT NO. : 6,871,581 B2
DATED : March 29, 2005
INVENTOR(S) : Akira Suzuki

It is certified that error appears in the above-identified patent and that said Letters Patent is hereby corrected as shown below:

Column 6,
Line 11, please change "a" to -- the --
Lines 12 and 65, please change "remained" to -- remaining --

Column 7,
Line 56, please change "remained" to -- remaining --
Line 57, please change "Owing" to -- Due --

Column 8,
Line 2, please delete "there"
Line 3, please delete "needs"; please delete the first occurrence of "to" and replace with -- is required for --; please replace "and it" with -- , which --
Line 19, please add -- for example -- before "it"; please change "is necessary to" to -- must --
Line 20, please add -- the -- before "cooking"
Lines 22 and 23, please change "a" to -- the --
Lines 43, 48, 55, 58 and 62, please change the first and second occurrences of "a" to -- the --

Column 9,
Lines 1 and 7, please change the first and second occurrences of "a" to -- the --

Column 11,
Line 26, please delete ","

UNITED STATES PATENT AND TRADEMARK OFFICE
CERTIFICATE OF CORRECTION

PATENT NO.   : 6,871,581 B2
DATED        : March 29, 2005
INVENTOR(S)  : Akira Suzuki It is certified that error appears in the above-identified patent and that said Letters Patent is hereby corrected as shown below:

Column 12,
Line 35, please change "od" to -- of --

Signed and Sealed this

Seventh Day of June, 2005

JON W. DUDAS
*Director of the United States Patent and Trademark Office*